Dec. 25, 1945. L. B. WINTON 2,391,852
LIQUID LEVEL INDICATOR
Filed Oct. 15, 1942

Inventor:
Lewis B. Winton
by Emery, Booth, Townsend, Miller, Weidner
Attys.

Patented Dec. 25, 1945

2,391,852

UNITED STATES PATENT OFFICE 2,391,852

LIQUID LEVEL INDICATOR

Lewis B. Winton, Greenwich, Conn., assignor, by mesne assignments, to Jerguson Gage & Valve Company, Somerville, Mass., a corporation of Massachusetts Application October 15, 1942, Serial No. 462,081

8 Claims. (Cl. 73—299)

This invention relates to liquid level indicating devices and the object is to provide a mechanism for use with containers which are subject to bodily angular movement in use whereby excessive fluctuations of the indication will be avoided. Thus in the case of a marine boiler as the vessel rolls or pitches the water surges from one part of the boiler to another. Thus the water level, as exhibited, for example, in an ordinary gage glass, fluctuates rapidly, and in fact the usual gage glass may become practically useless in a seaway. Similar action is observed in the case of other indicating instruments.

In accordance with my invention I provide an indicating mechanism wherein there is embodied suitable mechanical valve means for checking the flow of liquid between the boiler or like container and the indicating mechanism, which tends to take place as the system is inclined and which flow would otherwise cause abnormal fluctuation of the indication. As a result an indication fluctuating only slightly and practically useful as showing the water level in the boiler, as it would be when the ship were on an even keel or in its normal trim, will be at all times observable.

My invention will be well understood by reference to the following description of an illustrative embodiment thereof shown by way of example in the accompanying drawing, wherein.

Figure 1:
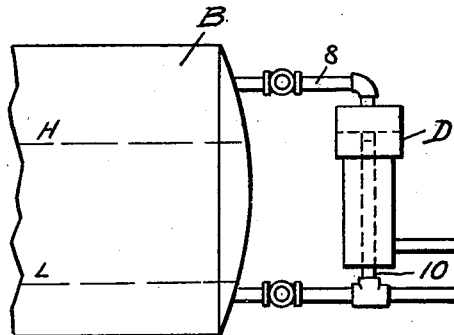
Fig. 1 is a diagrammatic illustration of the mechanism connected to a boiler drum.

Referring now to Fig. 1 of the drawing, I there show diagrammatically the upper drum B of a marine boiler, the water level in which is indicated by a remotely located differential manometer M, herein shown as a hydrostatic manometer of the inverted U-tube type having spaced legs containing a manometric fluid lighter than water. This manometer is shown as connected to the boiler in accordance with the principles of the Tripp Patent 722,645, the left-hand leg of the inverted U, viewing the drawing, being connected by the piping L. P. (indicating the expression "low pressure") to the water-containing spaces of the drum B, while the right-hand leg is connected by the connection H. P. ("high pressure") to a "datum chamber" D in which a fixed hydrostatic head of liquid is provided, the chamber being replenished by condensate supplied by the connection 8 to the steam-containing spaces of the boiler and having an overflow 10, herein leading to the water-containing spaces of the boiler, whereby there is provided a liquid column, the top of which is at the top of the overflow tube. One leg of the U-tube may have incorporated therein as a part thereof a gage glass G of the type having a metallic body and a flat glass or glasses, and herein the water on the low pressure side of the system beneath the liquid piston provided by the manometric fluid which separates the liquid columns of variable and constant hydrostatic head moves in the gage in the manner of the water column of an ordinary gage glass to indicate the liquid level in the boiler. An arrangement such as described may be located at any convenient position relative to the boiler as the heads in the connecting pipes L. P. and H. P. below the low water level of the boiler balance one another.

Considered as an example of my invention, the inverted U-tube manometer shown may be considered as exemplifying any differential manometer subject to variable and constant hydrostatic heads, the difference between which is proportional to the liquid level in the boiler. On the other hand, we might consider the gage G as the equivalent of an ordinary gage glass in which the lower end is connected with the water-containing space of the boiler and showing a column of boiler liquid indicative of the level. Herein because of the position of this glass an opposed compensating hydrostatic head has been introduced. We might consider the ordinary gage glass, in which the upper end is connected directly to the steam-containing spaces of the boiler above the high water mark, as a special case wherein such compensating head has a zero value.

For purposes of simplicity in the description, let us suppose that Fig. 1 represents a marine installation wherein the datum chamber and the legs of the U-tube are in the central plane of the boiler in an athwartships plane. The effect on the indication of pitching of the vessel is then not serious, but if the vessel rolls from side to side, corresponding to a movement in the plane of the paper in the drawing, the water surges in the drum B. If we imagine the system as rotated counterclockwise, viewing the drawing, the datum chamber will be raised relative to the center of the boiler, increasing the differential of pressure and causing a lowering of the indication in the gage glass. As the vessel swings back in the other direction, the surface in the gage will move violently upward.

Herein this action and the flow of liquid to or from the boiler to cause fluctuation at the manometer is controlled by valves V, which may conveniently be located as shown at opposite sides of the manometer M in the respective L. P. and H. P. connections. Before describing the operation of these valves it will be convenient first to describe in detail the particular mechanical form shown by way of example in Figs. 2, 3 and 4.

Figure 2:
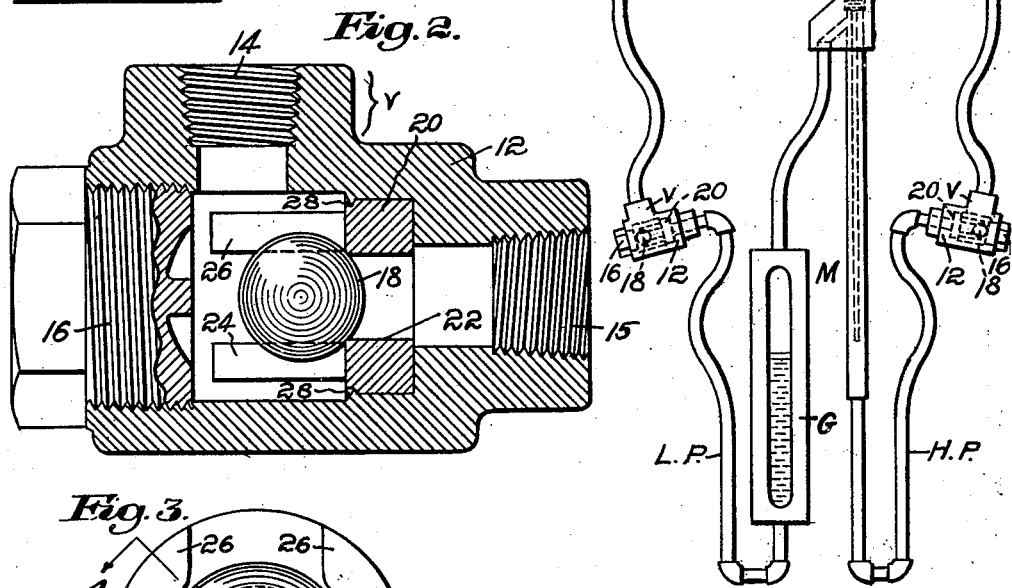
Fig. 2 is a central longitudinal section through a valve.

Referring, therefore, first to Fig. 2, the valve V comprises a suitable valve casing 12 having the connections 14 and 15 whereby it may be interposed in a pipe-line and an opening at the left, viewing Fig. 2, through which the valve inside may be inserted and which is closed by a plug 16. The valve inside herein includes a valve proper in the form of a free ball 18 and a unitary element providing a seat and ball-guiding and positioning means and which is illustrated in detail in Figs. 3 and 4. While the size of the parts may, of course, be varied within wide limits, I may state that I have obtained good results with a stainless steel ball ½ inch in diameter.

Figure 3:
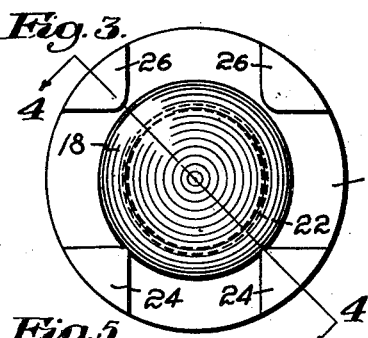
Fig. 3 is an end view of the valve inside as seen from the left of Fig. 2 and on a larger scale.
Figure 4:
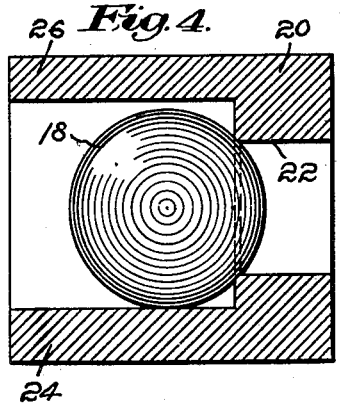
Fig. 4 is a section on the line 4—4 of Fig. 3.

The construction of the seat and guide for the ball may be perhaps most conveniently described by describing the manner in which it may be made. A block of suitable metal may be turned to provide a cylindrical body 20 pierced from one end by a circular port 22 and the other end may be milled across in intersecting planes, relatively perpendicular planes in the present instance, to leave projecting parallel to the axis of the port 22 segmental fingers 24 and 26 pointing radially inwardly, their inner edges corresponding to the elements (using that word in the geometrical sense) of a cylinder coaxial with the center line of the port and the distance between them being substantially equal to the diameter of the ball 18. The piece may then be hardened and then chucked in a suitable grinder and the margin of the port 22 ground to form a seat as illustrated. The inwardly presented edges of the fingers 24 and 26 are ground, in the case of the two lower fingers 24, viewing Fig. 3, to a very narrow face, say about .02 of an inch wide, tangential of the ball, to provide a pair of tracks on and between which the ball may roll while the upper two fingers 26, as seen in Fig. 3, may be ground to provide a slight clearance, the dimensions preferably being such that the ball may be freely inserted within the annular group of fingers and will move perfectly freely therein but without any substantial lateral shake. As these grinding operations may all take place while the device is held in the chuck, the parts are formed true and in definite relation to the center line.

The piece 20 is assembled with the valve casing 12 as illustrated in Fig. 2 with port 22 in alignment with passage 15 and may be secured in position by staking at points around the circumference, certain of which are indicated at 28 in Fig. 2.

The ball assembled between the fingers in the manner shown is thus supported in centered relation to its seat and will roll into cooperation with the same to close the passageway or away from the seat to open it without any possibility of sticking.

The valves V may be mounted, as shown in Fig. 1, at opposite sides of the manometer with the axial line corresponding to the path of the center of the ball (parallel to the tracks 24 on which it rides) inclined outwardly and downwardly at slight angles to the horizontal at either side of the gage so that with the parts in the normal upright position illustrated in Fig. 1 the balls roll on the tracks 24 outwardly and downwardly on either side and the valves are open. Now, if we consider the entire system to swing counterclockwise in the plane of the paper, the axial line of the right-hand valve approaches the horizontal and as it passes beyond the same the ball rolls to the left against its seat, shutting off the flow of fluid in that direction and preventing the increased head due to the lifting of the datum chamber D from having any further influence on the indication in the gage G. If the system is tipped in the other direction, the left-hand valve V functions in a similar manner.

I have referred to the axial lines of the valves as being disposed at a slight angle to the horizontal. In Fig. 1 of the drawings I have shown this angle as about 15°, partly to show the construction graphically. The angle can conveniently be much less. In the case of a ship, obviously it will be much less than the maximum roll of the ship. The fluctuation of the indicating surface of the gage in an installation such as that shown will depend for a given angle of inclination of the system on the position of the datum chamber D relative to the center of the boiler, the spacing of the legs in the manometer M and the specific gravity of the fluids involved. In general the angle of the path of the ball may be chosen so that the fluctuations which are permitted will be small and provide for holding the level almost constant so as to give a workable indication.

Provision may be made for adjusting the angle. In the example shown connections to and from the valve V are made with small copper tubing, in which case the angle may be adjusted by bending the tubing somewhat, as is indicated in the drawing by showing the piping at either side of the valves more or less convoluted.

Figure 5:
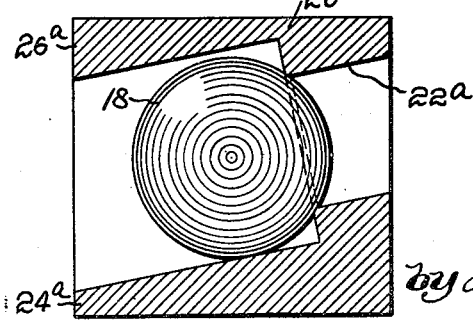
Fig. 5 is a view similar to Fig. 4 showing a modified construction.

In Fig. 5 I have shown an alternative form of valve inside in which the axial line of port 22a and fingers 24a and 26a is at a definite angle to the exterior cylindrical surface of the piece 20. With such a structure set to operate at the definite angle thus provided, the valve casing would appear horizontal when assembled in the system in the manner shown in Fig. 1. In this figure the angle is shown as about ten degrees in order to make the construction graphically striking.

The angular adjustment is also of advantage for marine use in case the ship, due to conditions of loading or weather conditions, is trimmed other than at an even keel. The adjustment permits the positioning of the valves at the desired angle to the true horizontal.

In an arrangement such as shown in Fig. 1, in which the two valves V are at opposite sides of the manometer M and close toward the same to prevent flow of fluid to the manometer when closed, they may serve also the purpose of the customary check valves, as it will be clear that if the glass in the gage G breaks the pressures involved will close the valves, easily overcoming the slight gravity bias toward open position and shutting the manometer off from the boiler. In their construction and in their combination with the other parts of the system, however, they differ entirely from check valves as hitherto used in connection with gages and the like and therefore subserve the function of controlling the fluctuations of the indicating instrumentality when the system is inclined in the manner already described.

While it is convenient to assemble the valves in the manner indicated and when so assembled they have an additional function as check valves as above described, clearly they might be placed anywhere in the liquid-containing portions of the mechanism. It will be understood that in referring to "valves" in the plural, physically separate identical units are not necessarily to be understood.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A liquid level indicating mechanism for use with containers subject to bodily displacement angularly comprising a differential manometer, connecting means for placing one side of the manometer in communication with the body of liquid being measured and the other side in communication with a source of fixed hydrostatic pressure, said connecting means having interposed therein a pair of valves each comprising a seat and a loose valve ball and means for supporting the ball such that it gravitates bodily away from its seat when the container is in normal upright position but rolls into cooperation therewith when the container is inclined through a small angle in a direction to depress the seat, the two valves closing respectively pursuant to inclinations in opposite directions.

2. A liquid level indicating mechanism for use with containers subject to bodily displacement angularly comprising a differential manometer connecting means for placing one side of the manometer in communication with the body of liquid being measured and the other side in communication with a source of fixed hydrostatic pressure, said connecting means having interposed therein a pair of valves each comprising a seat and a loose valve ball and means for supporting the ball such that it gravitates bodily away from its seat when the container is in normal upright position but rolls into cooperation therewith when the container is inclined through a small angle in a direction to depress the seat, the two valves closing respectively pursuant to inclinations in opposite directions, the valves being angularly adjustable in vertical planes independently of the manometer and of the container to which it is connected.

3. A liquid level indicating mechanism for use with containers subject to bodily displacement angularly comprising a differential manometer, connecting means for placing one side of the manometer in communication with the body of liquid being measured and the other side in communication with a source of fixed hydrostatic pressure, said connecting means having interposed therein a pair of valves each comprising a seat and a loose valve ball and means for supporting the ball substantially centered with the seat, the common center line being normally inclined downwardly at a slight angle to the horizontal, whereby the valve gravitates bodily away from its seat when the container is in normal upright position but rolls into cooperation therewith when the container is inclined through a small angle in a direction to depress the seat, the two valves closing respectively pursuant to inclinations in opposite directions.

4. Mechanism for indicating the liquid level in a container subject to bodily displacement angularly comprising a conduit communicating at one end with the liquid-containing space of the container to receive a liquid column of variable head therefrom and receiving at the other end a liquid column of constant head, there being a body of different liquid interposed between said columns of liquid to indicate by its position the liquid level, a pair of valves in the conduit, each comprising a seat and a loose valve ball and means for supporting the ball such that it gravitates bodily away from its seat when the system is in normal upright position but rolls into cooperation therewith when the system is inclined through a small angle in a direction to depress the seat, the two valves closing respectively pursuant to inclinations in opposite directions.

5. A mechanism for indicating the liquid level in a container subject to bodily displacement angularly comprising a receptacle for a liquid column connected at one end to the liquid-receiving space of the container and at the other end to a source of pressure such that the difference of the opposed pressures on the column is proportional to the head of liquid in the container, the liquid-containing parts of the mechanism including a pair of valves incorporated therein, each comprising a seat and a loose valve ball and means for supporting the ball such that it gravitates bodily away from its seat when the container is in normal upright position but rolls into cooperation therewith when the container is inclined through a small angle in a direction to depress the seat, the two valves closing respectively pursuant to inclinations in opposite directions.

6. A mechanism for indicating the liquid level in a container subject to bodily displacement angularly comprising a receptacle for a liquid column connected at one end to the liquid-receiving space of the container and at the other end to a source of pressure such that the difference of the opposed pressures on the column is proportional to the head of liquid in the container, the liquid-containing parts of the mechanism including a pair of valves incorporated therein, each comprising a seat and a loose valve ball and means for supporting the ball such that it gravitates bodily away from its seat when the container is in normal upright position but rolls into cooperation therewith when the container is inclined through a small angle in a direction to depress the seat, the two valves closing respectively pursuant to inclinations in opposite directions, the valves being angularly adjustable in vertical planes independently of the receptacle and of the container to which it is connected.

7. A mechanism for indicating the liquid level in a container subject to bodily displacement angularly comprising a receptacle for a liquid column connected at one end to the liquid-receiving space of the container and at the other end to a source of pressure such that the difference of the opposed pressures on the column is proportional to the head of liquid in the container, the liquid-containing parts of the mechanism including a pair of valves incorporated therein, each comprising a seat and a loose valve ball and means for supporting the ball substantially centered with the seat, the common center line being normally inclined downwardly at a slight angle to the horizontal, whereby the valve gravitates bodily away from its seat when the container is in normal upright position but rolls into cooperation therewith when the container is inclined through a small angle in a direction to depress the seat, the two valves closing respectively pursuant to inclinations in opposite directions.

8. A liquid level indicating mechanism for use with containers subject to bodily displacement angularly comprising a differential manometer, connecting means for placing one side of the manometer in communication with the body of liquid being measured and the other side in communication with a source of fixed hydrostatic pressure, said connecting means having interposed therein a pair of valves, one at each side of the manometer, each comprising a seat and a loose valve ball at the further side of the seat relatively to the manometer and means for supporting the ball such that it gravitates bodily in a direction away from the manometer and away from its seat when the system is in normal upright position but rolls into cooperation therewith when the system is inclined through a small angle in a direction to depress the seat while both valves close if pressure is released at the manometer.

LEWIS B. WINTON.